US009055733B2

(12) United States Patent
Jones, II

(10) Patent No.: US 9,055,733 B2
(45) Date of Patent: Jun. 16, 2015

(54) ANIMAL TRACKING SYSTEM

(71) Applicant: Johnny Jones, II, Aurora, CO (US)

(72) Inventor: Johnny Jones, II, Aurora, CO (US)

(*) Notice: Subject to any disclaimer, the term of this patent is extended or adjusted under 35 U.S.C. 154(b) by 0 days.

(21) Appl. No.: 13/861,528

(22) Filed: Apr. 12, 2013

(65) Prior Publication Data

US 2013/0285815 A1 Oct. 31, 2013

Related U.S. Application Data

(60) Provisional application No. 61/638,201, filed on Apr. 25, 2012.

(51) Int. Cl.
| G08B 23/00 | (2006.01) |
| A01K 29/00 | (2006.01) |
| A01K 1/03  | (2006.01) |
| A01K 11/00 | (2006.01) |

(52) U.S. Cl.
CPC .................................... A01K 11/008 (2013.01)

(58) Field of Classification Search
USPC ............. 340/573.3, 10.1, 539.13, 573.1, 540, 340/539.11, 539.23, 539.21, 687, 568.1, 340/539.3, 426.192; 119/174, 14.14, 719, 119/720, 721, 851, 908, 655, 421, 792; 342/357.63, 357.71, 357.74
See application file for complete search history.

(56) References Cited

U.S. PATENT DOCUMENTS

| 7,394,364 B2 | 7/2008 | Elliott |
| 2005/0145187 A1* | 7/2005 | Gray .............................. 119/174 |
| 2007/0171047 A1* | 7/2007 | Goodman et al. ........ 340/539.13 |
| 2008/0035072 A1* | 2/2008 | Lee ................................ 119/720 |
| 2008/0167985 A1 | 7/2008 | Yarnall |
| 2009/0276012 A1* | 11/2009 | Hyde et al. ...................... 607/60 |
| 2010/0238022 A1 | 9/2010 | Au |
| 2013/0014706 A1* | 1/2013 | Menkes ........................ 119/859 |

* cited by examiner

*Primary Examiner* — Mirza Alam
(74) *Attorney, Agent, or Firm* — Daniel Boudwin; Global Intellectual Property Agency LLC

(57) ABSTRACT

An animal tracking system is provided for remotely monitoring animal positioning, The system includes an implant device, a global positioning system, a network, one or more remote servers, and at least one wireless computing device. The implant device acts as a GPS receiver, calculating the animal's position and then transmitting the results to the remote server where they are stored in a database. Owners can remotely access the database via a software application installed on a wireless computing device. Users can select an acceptable roaming range for the animal, an acceptable range between the animal and other animals being tracked, a lack of movement, or substantial changes in body temperature. Additionally, the implant device can directly connect with the wireless computing device via a Bluetooth connection. In this way, the computing device can access or transfer data regarding the owner's contact information, and an animal's medical history.

4 Claims, 4 Drawing Sheets

ANIMAL TRACKING SYSTEM

CROSS REFERENCE TO RELATED APPLICATION

This application claims the benefit of U.S. Provisional Application No. 61/638201 filed on Apr. 25, 2012, entitled "All About My Pet." The patent application identified above is incorporated here by reference in its entirety to provide continuity of disclosure.

BACKGROUND OF THE INVENTION

Field of the Invention

The present invention relates to a system for tracking animals. More specifically, it relates to a system that notifies authorized individuals of animal whereabouts, possible death or injury, and proximity to other tracked animals. The invention may be used with a singular animal such as a domestic pet or employed for tracking herd animals and other livestock. Pet owners, Farmers and Ranchers alike will appreciate the convenience of monitoring their animals at all times.

Keeping track of outdoor pets has always been a problem for pet owners. Fences, tie out tethers, invisible fencing and leashes are often used to keep animals within the curettage of the home. Often pet owners will leave the animal outside unattended, with the assumption that the aforementioned barriers and prevention mechanisms will stop the animal from getting outside of the owner's supervisory area. But despite the substantial deterrent provided by such barriers, pets often manage to escape their confinement and roam free and unrestrained.

Lost pets present a danger to both themselves and people around them. When animals stray from their home area they often become disoriented and frightened, sometimes behaving erratically. Frightened animals may run out into the road, flee from people trying to help them, or even become aggressive.

Common methods of searching for lost pets do not offer a high likelihood of success. Such methods include notifying animal control and local animal shelters as to the pet's description, posting leaflets or posters depicting the pet's image, interviewing neighbors, and performing physical searches. The farther the animal wanders from its home area the less likely the pet will be rescued and brought safely home.

To assist in helping lost pets find their way home, passive emission microchips are embedded under the skin of adopted pets. These chips can be scanned by veterinarians, animal control, and the like to determine the animal's last home address, owner, and the owner's contact information. Lost animals brought in by these agencies, scan the pet and then contact the owner to inform them of the pees location. While this approach greatly increases the probability that a pet will eventually find its way home, it does not provide owners with a real-time update on the pets whereabouts. A real-time pet tracking system is needed that will assist pet owners in immediately locating their pets.

Description of the Prior Art

The present invention is an animal tracking system that is adapted for use with domestic pets as well as livestock and herd animals. A basic embodiment of the system includes a global positioning system unit, a wireless electronic device and a biomedical device having at least one receiving antenna, a storage means, a wireless communications means, a processing unit, and a battery. Multiple biomedical devices may be used to track a number of animals at once. Each device is subcutaneously inserted into a target animal. The animal's position is determined using the global positioning system unit, and relayed to the wireless electronic device. Additionally, essential information about the animal is stored on the storage media of the biomedical device and updated via the wireless communication link between the biomedical device and the wireless electronic device. The following prior art is a list of systems deemed relevant to the present disclosure.

Yarnall, U.S. patent Application Publication No. 2008/0167985 discloses a system and method for an Internet based animal tracking system that allows animal owners and other authorized users to access animal records. These Records may be accessed by government agents or veterinarians to track the animal's location, ownership, and other related data. A secure server holds the records and is updated whenever the ownership, medical history, or geographical location of an animal is changed. This information is not based on on-demand tracking such as GPS locating, but rather, is based upon records of animal sales and the like. Identification numbers are assigned to animals and are used for record association, update, and lookup. Unlike the Yarnall device, the present invention does not involve an internet website or portal. Instead it uses a real-time tracking system to locate an animal's current whereabouts and. Additionally, the system of the present invention stores an animal's medical history in an onboard storage means rather than an offsite computer. Thus any veterinarian who has physical access to the animal can easily determine its medical history without having to leave the animal in search of a computer.

Another animal tracking system is taught by Au, U.S. Patent Application Publication No. 2010/0238022. The Au system includes a microchip embedded in the collar worn by an animal and in communication with a pet locator device. The microchip emits a steady radio signal that is perceived by the pet locator device. A screen on the device depicts the pet's current location, while a speaker provides audible notifications to the user. The pet location device has a power button that initiates the system and shuts tracking down. Unlike the Au system, the present invention contains a subcutaneous device that cannot be removed without medical assistance. Further, the invention facilitates storage of medical data and ownership history within the embedded device, whereas the Au invention is only useful for locating an animal.

Finally, Elliott, U.S. Pat. No. 7,394,364 teaches an item location tracking system and method. The system employs transmitters attached to items, which can be removably secured to people, animals, or other items. These transmitters emit radio signals at intervals differentiated by prime numbers. Coded signals convey transmitter and base unit identifiers. Base units perceive the emitted radio signals using an omnidirectional antenna to determine item distance and direction. System administrators can check on the location of a moving target using the transmitter ID associated with the item. Suggested applications include bracelets for geriatrics, collars for dogs, and tags for merchandise. The Elliott system does not include a transmitter coupled with a storage means. The present invention includes a biomedical implant device that stores information about the animal in which it is implanted. This information can be wirelessly transmitted to any authorized user and need not be associated with a specific base unit. Elliott requires connection to a specific base unit. The present invention overcomes this lack of versatility by providing Bluetooth connectivity with a variety of wireless communication devices.

These prior art devices have several known drawbacks. None of these devices discloses a tracking system that employs an implant device that stores information pertaining to the target animal, a satellite connection, and one or more wireless communication devices. The system provides location tracking, medical history lookup, and tracking of proximity to other targets. In this way, the system differs from previously known systems and methods. It substantially diverges in design elements from the prior art and consequently it is clear that there is a need in the art for an improvement to existing animal tracking systems. In this regard the instant invention substantially fulfills these needs.

SUMMARY OF THE INVENTION

In view of the foregoing disadvantages inherent in the known types of the animal tracking systems now present in the prior art, the present invention provides a new short range data transfer and storage media wherein the same can be utilized for providing convenience for the user when tracking animals and storing their medical history The present invention is a system for tracking animal locations and medical histories. It can be used with individual animals or groups. The system includes an implant device that is in communication with global positioning system (GPS) satellites, one or more remote database servers and wireless communication devices such as tablet computers, laptops and smart phones. The biomedical grade implant incorporates a GPS receiver that determines the animal's location to a predetermined degree of accuracy and then transmits this information to a remote database. Wireless communication devices running a software application connect to the database and can retrieve information about the animal's whereabouts. Location information is updated at regular intervals but may be updated sooner if solicited by a user. This aspect of the system facilitates real-time tracking of animal targets by animal owners, authorities, and doctors.

In addition to the GPS receiver, the implant contains a storage media for maintaining an animal's medical records. The implant wirelessly communicates with any Bluetooth enabled device such as a laptop, smart phone, or tablet computer to transfer and retrieve data from the storage media. Veterinarians cam use a wireless communication device to retrieve an animal's medical history before treating the animal. Once treatment is completed the medical history stored on the storage media is updated to include the details of the any recent procedures. Any medical professional or authority figure in possession of the animal can access its medical history. This information is important to ensure proper diagnosis and treatment of an animal's ailments, as well as alerting medical staff to any potentially communicable diseases the animal carries. Immediate access to medical history is essential for personnel responsible for treating lost or injured animals.

The system also includes a software application installed on a wireless computing device. The software application facilitates communication between the wireless device and the remote database server. Users can select a variety of options in the software application including location tracking of single animals, a group of animals; track proximity of animals to each other or to a specific location; and initiate alerts regarding animal movements.

It is therefore an object of the present invention to provide a new and improved animal location tracking system that has all of the advantages of the prior art and none of the disadvantages.

It is another object of the present invention to provide real-time location information about target animals.

Another object of the present invention is to provide a system that gives medical professional instant access to an animal's medical history.

Yet another object of the present invention is to provide a system that tracks the proximity of an animal to other animals.

Still another object of the present invention is to provide a system that alerts users as to the whereabouts of their animals.

A further object of the present invention is to utilize an implant device that communicates with global positioning systems, a remote database and individual for the purposes of tracking animal locations and medical history.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
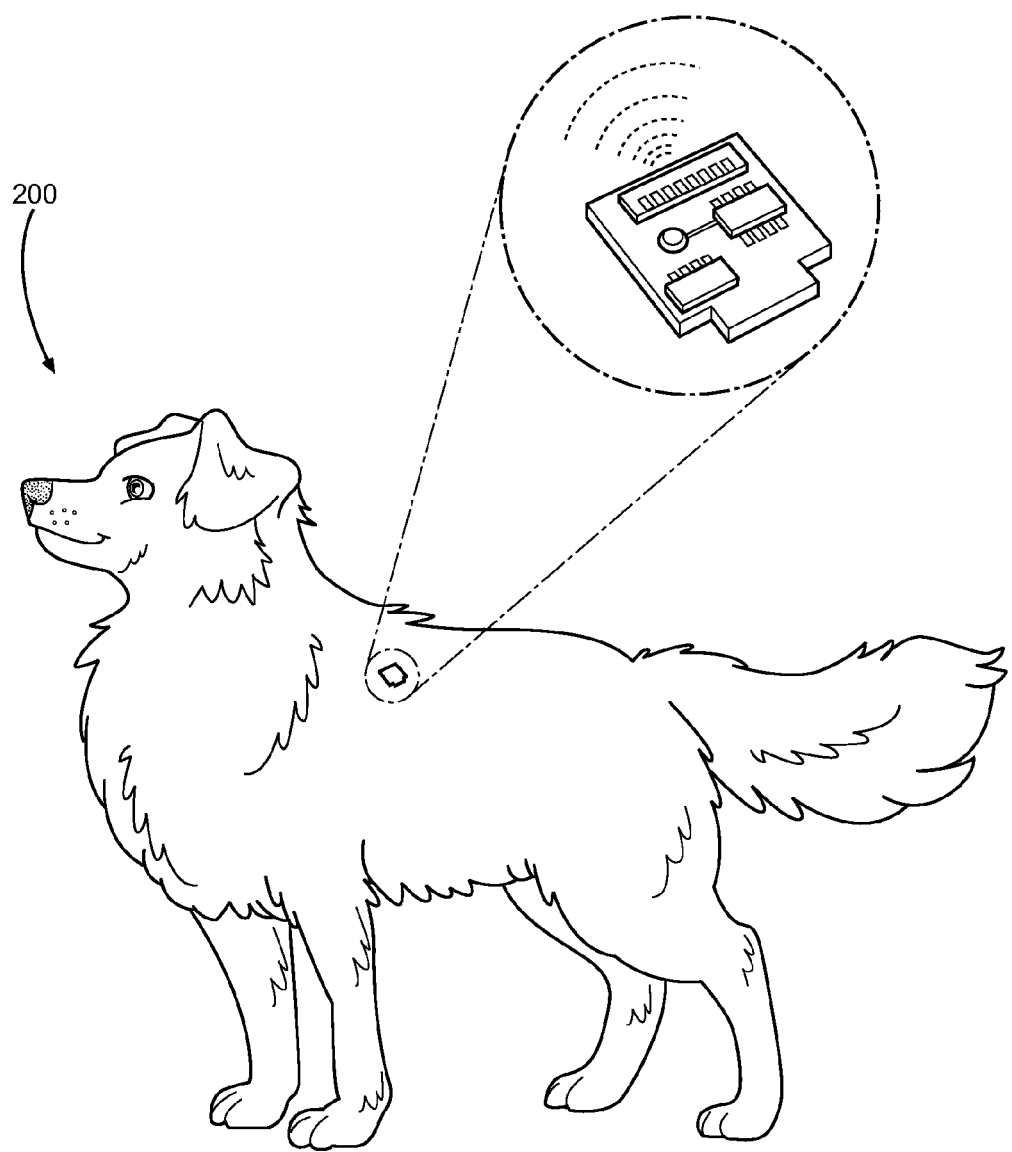
FIG. 1 shows a perspective view of the implant device of the present invention inserted under the skin of a dog. An exploded view of an exemplary implant device is shown to illustrate that the device can have a microchip construction.

Reference is made herein to the attached drawings. Like reference numerals are used throughout the drawings to depict like or similar elements of the animal location tracking system. For the purposes of presenting a brief and clear description of the present invention, the preferred embodiment will be discussed as used for tracking the location of animals. The figures are intended for representative purposes only and should not be considered to be limiting in any respect.

The system in use is shown in FIG. 1 with the implant device inserted under the skin of a dog. The dog 200 is not impeded by the presence of the implant because it is inserted under loose sections of skin such as those between or around the shoulder blades. In the exemplary illustration, the implant is a microchip, but it may alternatively be a set of components contained within an implant-grade capsule, or coated in a tissue safe coating. It is preferred that the implant device is inserted in the same general area in all target animals so that veterinarians and emergency personnel can easily locate the device.

As the dog moves around a GPS receiver built into the implant continuously recalculates the dog's position. Animal location is calculated via third dimensional trilateration. Methods and algorithms for GPS based location determination are well known in the art and the specific method used to determine the animal's location may vary according to the implementation of the system. Like all GPS receivers, the implant device sends and receives signals to four or more GPS satellites, calculating time offsets as needed to accurately determine the location of the receiver. Because animals are generally small, and potentially fast moving, a small radius of error is desired. Updates on location changes are sent to a remote server at predetermined intervals to ensure that the system has the most current information about the animal's whereabouts.

Figure 2:
FIG. 2 shows a perspective view of a herd of cattle implanted in several cows. One member of the herd is separated from the group, resulting in the transmission of an alert to a remote user.

Another example of the present system in use is shown In FIG. 2 with a herd of cattle implanted with the implant device. The herd 300 roams freely over a grassy pasture 400 and is largely clumped together. One loner 301 has wandered away from the rest of the herd. If it roams too far, the lone cow can become lost, disoriented, or injured, making it difficult if not impossible for it to find its way home. The owner of the cow may have no idea of the animal's plight until the cows come home and are counted.

The present invention solves this problem by providing not only the ability to track the location of multiple animals, but also the ability to track their proximity to one another. A user can enter the identification numbers of each animal she wishes to track in the software application interface on a wireless communication device. She can then decide what notifications she would like to receive. Such notifications will include 1) animal roams outside of selected location area; 2) animal roams outside location of other animals; 3) animal has not moved for a set period of time; and 4) animal's temperature is outside normal averages. In the depicted example, the lone cow's implant device transmits its GPS coordinates to the remote server as per usual. The remote server updates the location tracking database to include the animal's present location and then checks for any additional instructions based on alert selections. If the owner has selected a proximity monitor for the animal, the database will compare the animal's location against that of other animals in the herd. When the lone cow roams too far from the herd, the remote server will send an alert to the user. The alert may be audible, or visual according to the user's preferences.

Figure 3:
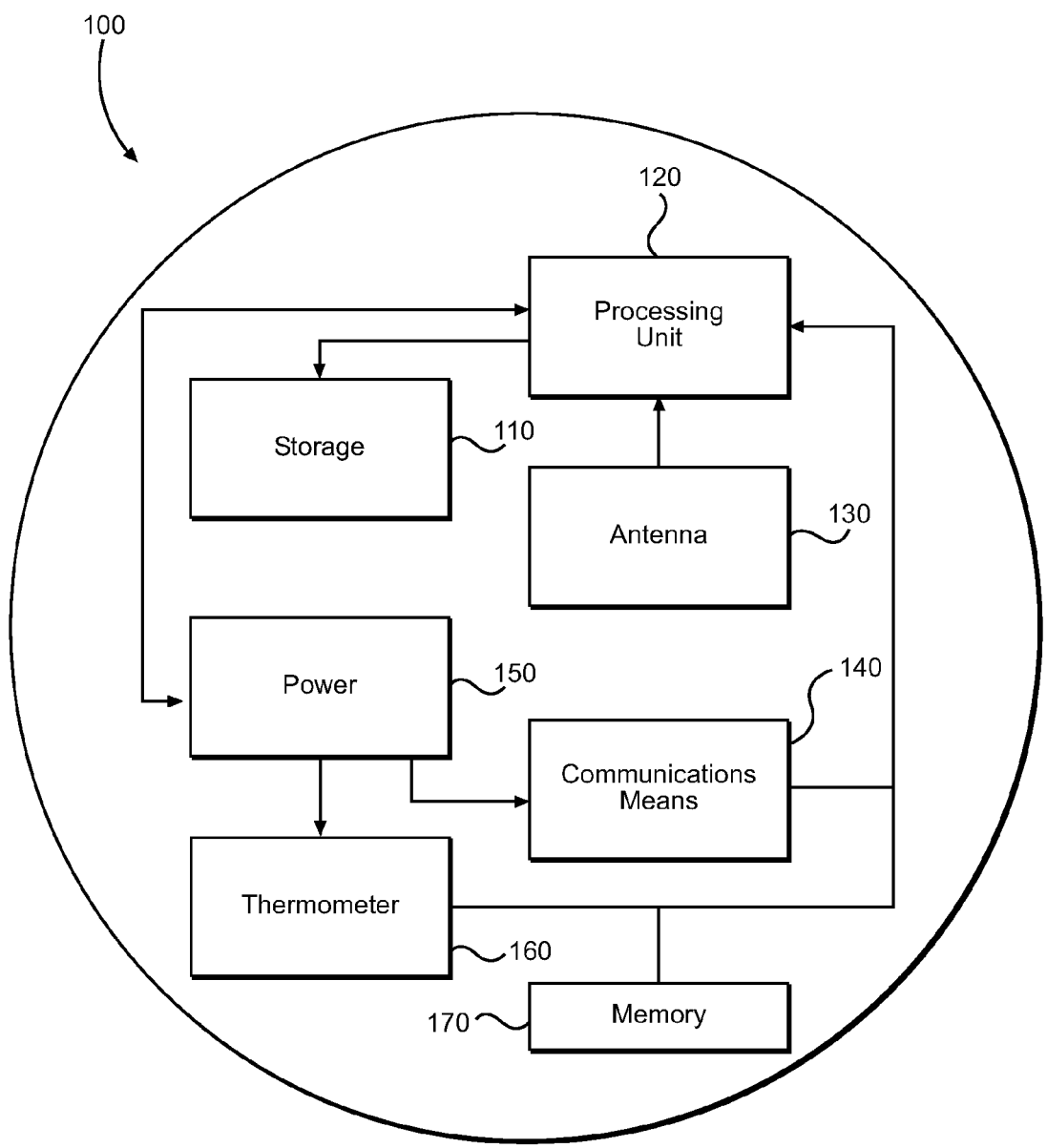
FIG. 3 shows an exemplary embodiment of the implant device of the present invention.

Turning now to FIG. 3 there is shown an exemplary implant device 100. The device has a permanent storage media 110, one or more antennas 130; a processing unit 120; a wireless communications means 140 such as a network interface; a thermometer 160; and a battery 150. The storage media retains software necessary for enabling the GPS receiver functionality of the device. One or more antennas, preferably omni-directional radio antennas are operatively connected to an input and output terminal of the processing unit. Incoming signals from the antennas are processed by the processing unit and sent to memory for temporary storage during location calculation. Location information is stored in the storage media and transmitted to a remote server hosting a database. A network interface 140 facilitates this wireless communication with the implant device over a network. The implant device also communicates with wireless computing devices via Bluetooth or other short range wireless networking protocol. This direct connection facilitates transfer of an animal's medical history to and from the storage media. A thermometer monitors the animal's body temperature which is recorded on the storage media and can be transmitted to either the remote server or to a wireless computing device. Power to the abovementioned components is provided by the onboard battery. The specific build of these components will vary according to the implementation of the system and it will be known to one of ordinary skill in the art how to configure them within the implant device.

Figure 4:
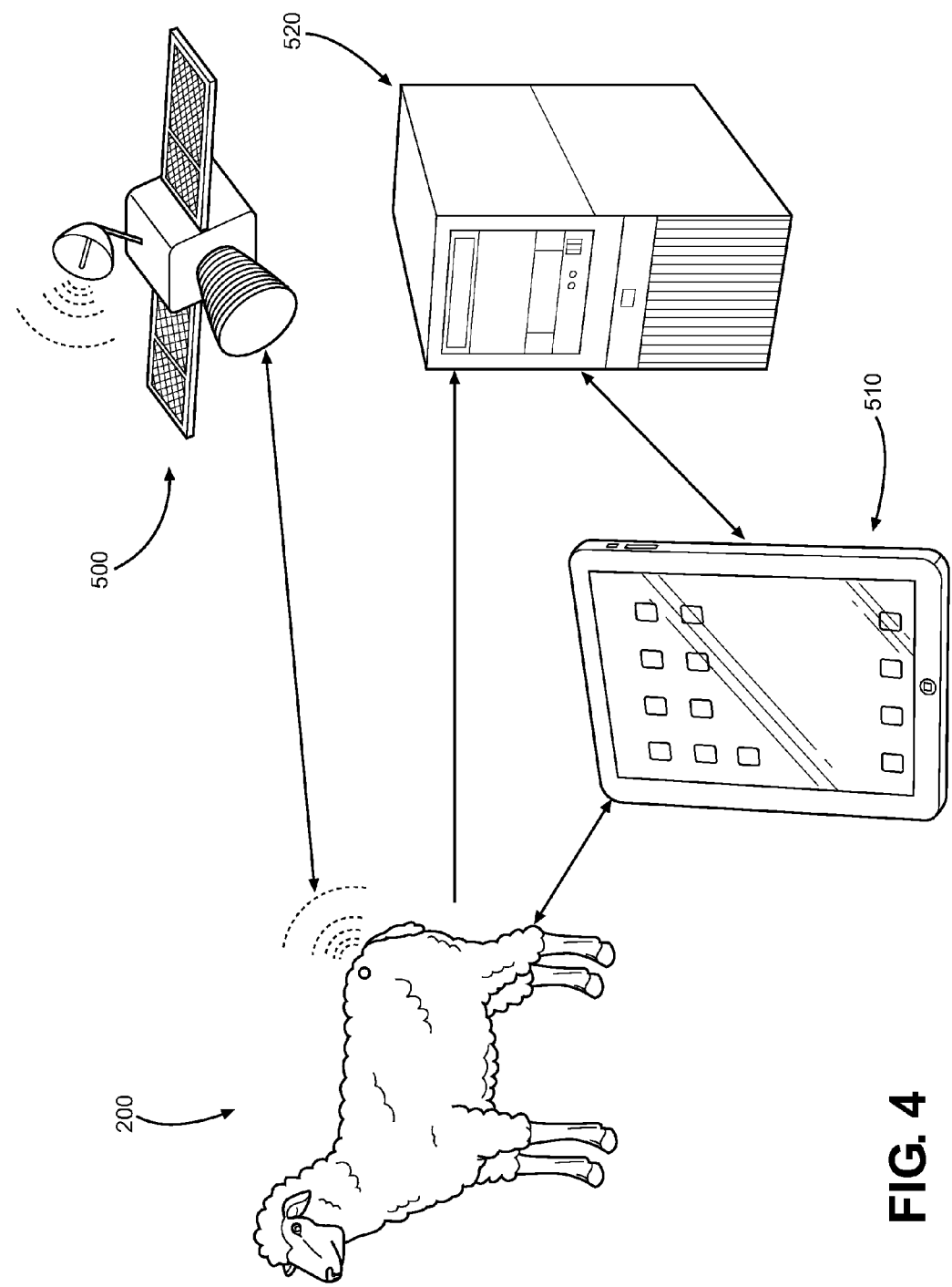
FIG. 4 shows a general system diagram of the present animal tracking system.

Referring finally to FIG. 4 there is shown a general system diagram of the present invention. A sheep 200 with the implant device installed in the rump area receives and sends signals to one of the twenty-seven or more GPS satellites in orbit around the Earth. Using satellite signal responses the GPS receiver in the implant device calculates the current location of the animal. The location is sent to a remote database server 520, which performs comparisons of the location against other data entries based on current user preferences. By way of example there may be a set of data cells for storing notifications associated with an animal. Notifications may include animal temperature updates, animal location updates, animal proximity to location and other animals, and animal lack of movement notices. Additionally the database may have an entry for "lost animal" that indicates that authorities should be notified, and may initiate such notification by sending an alert to local authorities via phone, email, text or the like.

Users can remotely connect with the server via a software application user interface on a smart phone, tablet computer, or other wireless computing device. The software application offers a map of the tracked animal's current location, along with a historical location tracking list for a set period of time. A set of notifications are selectable for adjusting tracking preferences. Upon selection, these preferences are updated in the remote server.

In addition to remote monitoring of animal location and temperature, authorities and veterinarians can wirelessly connect with the implant device by pairing it with a wireless computing device 510. Medical information such as prior surgeries, age, owner contact information, illnesses, medications, and any other pertinent information is stored on the storage media and can be accessed through the wireless computing device software application. A medical history option is available through the application and will show the most up to date medical and contact information for any selected animal. Animals are selecting for tracking and viewing within the software application by entering an identification number or string of characters associated with the animal's implant device.

In use an individual enlists the aid of a veterinarian or medical. professional to insert the implant device in the same area on each member of a herd of animals. To test the implant device, the medical professional uses a wireless computing device such as an office tablet computer to connect with the implant device. Using the software application, the medical professional updates each annual's medical history to indicate the day the implant was inserted, the owner's contact information, and any other important medical information pertinent to the animal.

The owner releases the animals into their regular surroundings. She installs the software application on her own wireless computing device and inputs the identification number associated with the implant devices of each animal she wants to track. Next she selects any notifications she would like to receive. A roaming radius is set for the herd or for each animal individually. The roaming radius is the distance the animals are allowed to roam from the input home location. Input is also provided for monitoring the animal's proximity to one another. If one member of the herd is sick, the owner selects a temperature monitoring notification, and a "non-moving" notification. In this way, the owner will be notified if the animal's body temperature exceeds normal levels or if the animal does not move for an input period of time. These settings can also be selected by the medical professional.

The owner is free to go about her business without worrying that something might happen to one of her animals. If one becomes lost, runs a fever, or roams too far from the herd, she will receive an alert via the wireless computing device. Alerts are easily modifiable via the user interface, and location tracking intervals can be increased or decreased as needed.

The present invention is a system for tracking animals individually or in a herd. It provides real-time location tracking, temperature monitoring, and medical history storage. Users can remotely keep an eye on their animals and will be notified if the animals wander, become sick, or do not move for a substantial period of time. Additionally, any medical professional or authority figure with a Bluetooth enabled wireless computing device can connect with the animal's implant device thereby accessing the animal's medical history. This feature is important as it gives instant access to individual animal medical records, informing nearby persons as to any communicable diseases or dangerous conditions the animal carries. It may also help save the lives of injured animals because the treating veterinarian can immediately access any illnesses, heart conditions, or other medical issues the animal has, thereby tailoring treatment options to the specific medical needs of the animal. Taken as a whole, the invention provides peace of mind to owners, and essential information to veterinarians.

To this point, the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal location tracking system, comprising:
   an implant device, wherein said implant device is an implant grade biomedical device adapted for subcutaneous insertion in an animal;
   wherein said implant device operates as a global positioning system receiver and is adapted to transmit calculated location information to one or more remote servers that host animal tracking databases and are in regular communication with said implant device;
   a global positioning system comprising a plurality of satellites and base stations, wherein said global positioning system is in regular communication with said implant device;
   a network;
   one or more wireless computing devices comprising a smart phone or a tablet computer that facilitates communication between said animal tracking databases and said implant device to offer a map of said animal's current location and a historical location tracking list for a set period of time;
   wherein said set period of time is increasable or decreaseable;
   said one or more wireless computing devices used to input an identification number associated with said implant device, a medical information of said animal, contact information of an owner of said animal, a set of global positioning system coordinates, and a roaming radius;
   wherein said roaming radius is a distance that said animal is allowed to roam from an input home station;
   said one or more wireless computing devices used for providing notifications to a user of exceeded parameters:
   wherein said notifications are modifiable via said one or more wireless computing devices;
   wherein said parameters include a distance of said animal from said set of global positioning system coordinates, a distance from said animal to one or more other target animals, said animal's body temperature, said roaming radius, and a period of time that has passed since said animal has changed location.

2. The system of claim 1, wherein said implant device further comprises a processing unit, a memory, a storage media, one or more radio antennas, a network interface, a thermometer, and a battery.

3. The system of claim 1, wherein said network is a cellular network.

4. The system of claim 1, wherein said network is a satellite based internet connection.

* * * * *